Patented Feb. 13, 1951

2,541,930

UNITED STATES PATENT OFFICE 2,541,930

AMIDES OF MONOCARBOXYLIC ACIDS HAVING ACARICIDAL AND DISINFECTING PROPERTIES

Henry Martin and Alfred Margot, Basel, Switzerland, assignors to J. R. Geigy A. G., Basel, Switzerland, a Swiss firm No Drawing. Application November 12, 1947, Serial No. 785,504. In Switzerland November 16, 1946

7 Claims. (Cl. 167—58)

This invention relates to the manufacture of amides of $\alpha,\beta$ unsaturated carboxylic acids and aims to provide new compounds having valuable acaricidal and disinfecting properties.

It has now been found that certain amides of these acids are valuable agents for combating parasitic organisms of the class of acaridae and bacteria.

According to the invention amides of $\alpha,\beta$ unsaturated carboxylic acids are produced which have the general formula:

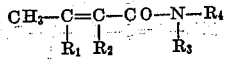

in which $R_1$ and $R_2$ denote hydrogen or a methyl group,
$R_3$ denotes a lower alkyl radical and
$R_4$ denotes an aralyphatic radical of the benzene series which may have non-salt-forming substituents, by reacting unsaturated mono carboxylic acids of the formula:

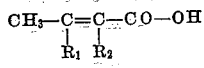

(in which $R_1$ and $R_2$ comply with the above definitions), or their reactive functional derivatives, such as halides, anhydrides, esters, amides or salts, with an amine of the formula:

(in which $R_3$ and $R_4$ comply with the above definitions), or their salts, metal compounds or reactive derivatives. Other methods for the production of the amides will be hereinafter described.

Amides of this kind hitherto have been unknown.

The parent acids of these acid amides however are known. These are crotonic acid, $\beta,\beta$-dimethylacrylic acid, $\alpha,\beta,\beta$-trimethylacrylic acid and $\alpha$-ethylidenepropionic acid.

The aromatic nucleus of the radical $R_4$ may be substituted by non-salt-forming substituents. By the term "non-salt-forming substituents" are to be understood, for example, halogen atoms, nitro, alkyl, alkoxy groups and the like.

As amine components, there may be used, for example, the following N-alkyl-arylamines: N-methyl-benzylamide, N-ethyl-benzylamine, N-isopropyl-benzylamine, N-methyl-o-methyl-benzylamine, N-methyl-p-nitro-benzylamine, N-ethyl-o-bromo-benzylamine, N-ethyl-3:4-di-chloro-benzylamine, N-ethyl-p-methoxy-benzylamine, $\alpha$-methyl-amino-n-propylbenzene, $\alpha$-ethylamino-p-chlor-ethylbenzene, $\alpha$-ethylamino-$\beta$-methyl-propylbenzene, N-methylphenethylamine, N-methyl $\beta$-phenyl-propylamine, $\alpha$-methyl-aminoisopropylbenzene, N-methyl-cinnamylamine, N-methyl-$\delta$-phenyl-butylamine and the like.

Various processes, known per se, may be employed for the production of the amides defined.

For example, $\alpha,\beta$ unsaturated carboxylic acids of Formula I

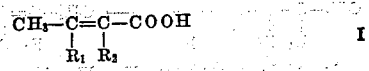

or their reactive functional derivatives, such as halides, anhydrides, esters, amides or salts may be reacted with N-alkyl-aralkylamines of Formula II

or their salts, metal compounds or reactive derivatives. This reaction is, in principle, in accordance with the following equation:

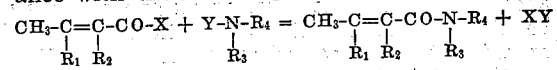

In the above formulae, $R_1$, $R_2$, $R_3$ and $R_4$ have the meaning defined above, whilst X and Y denote radicals which are split off in the reaction.

In the simplest case, the free acid is heated with the amine, water being split off (X=OH, Y=H; XY=H$_2$O). Again, for example, an alkali salt of the acid may be reacted with a salt of the amine by heating (for example, X=ONa, Y=HCl.H; XY=NaCl+H$_2$O). Acid halides or anhydrides may be reacted with the amine, if necessary in the presence of acid-binding agents, for which purpose the amine itself may be employed (for example, X=Cl, Y=H; XY=HCl). Also, acid halides or anhydrides may be reacted with metal compounds of the amines (for example, X=Cl, Y=Na; XY=NaCl) or, in a special case, acid halides may be reacted with hydrohalides of the amines (for example, X=Cl, Y=HCl.H; XY=2HCl). Esters react with the amines with the splitting off of alcohols (for example, X=OCH$_3$, Y=H; XY=HOCH$_3$) and, finally, amides likewise react with the N-alkyl-aralkylamines or their salts with the splitting off of ammonia or ammonium salts (for example, X=NH$_2$, Y=H, XY=NH$_3$).

A special modification, which also takes place in accordance with the above equation, is that of reacting salts of the acids with reactive carbamic-acid derivatives which are derived from the amines defined above. For example, carbamic-acid halides, which can be regarded as chloroformic-acid derivatives of the N-alkyl-aralkylamines may be reacted with alkali salts of the α,β unsaturated acids by heating, with the splitting off of carbon dioxide and alkali halide, to form the desired amides (for example, X=ONa, Y=Cl—CO—; XY=NaCl+CO₂).

The enumeration of these modifications makes no claim to completeness. Moreover, the reactions may be carried out by the methods described in the literature. See, for example, Weygand's "Organisch-chemische Experimentierkunst," page 381.

Instead of commencing with α,β unsaturated carboxylic acids of the formula

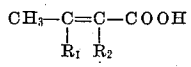

it is possible to commence with, for example, correspondingly suitably substituted saturated acids which are suitable for the production of the α,β unsaturated acids, and to convert them into the acid amides first, for example in a manner similar to that described, and then to form the double bond by the methods, which are customary for the production of α,β unsaturated acids (see Weygand, page 416). This process can be illustrated, in principle, by the following equation:

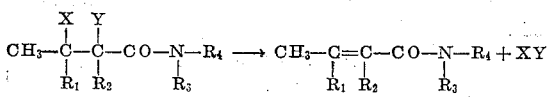

In this equation, R₁, R₂, R₃ and R₄ have the meaning defined hereinbefore whilst X and Y denote radicals which are split off together as XY in the reaction.

This process will be explained by way of example with the aid of the following possibilities:

(a) Splitting off of water from corresponding α- or β-hydroxyacid amides, in the first case X denoting H and Y denoting OH and, in the second case, X denoting OH and Y denoting H in the above equation. The splitting off of water may be effected by heating if necessary in the presence of catalysts such as iodine, or of dehydrating agents such as sulphuric acid, sodium bisulphate, oxalic acid, phosphorus halides, or zinc chloride. Especially suitable are the readily obtainable β-hydroxy-acid derivatives. For example, β-hydroxy isovalerianic-acid-N-methylbenzylamide may be converted into β,β-dimethyl-acrylic-acid-N-methyl-benzylamide by heating with agents that split off water.

(b) The hydroxyl group of the hydroxy-acid-amides may also be esterified with an acid. In this case, the formation of the double bond may be effected by splitting off a molecule of acid either by heating or by treatment with an acid-binding agent. Thus, for example, benzoic acid is split off from β-benzoyloxy-butyric-acid-N-methyl-o-chlorobenzylamide by heating, with the formation of crotonic-acid-N-methyl-o-chloro-benzylamide. In this case, X=OCOC₆H₅ and Y=H.

(c) The splitting off of hydrogen halide from corresponding α- or β-halogen-acid-amides (for example, X=H or Cl; Y=Cl or H) is quite analogous to the above mentioned splitting off of water from α- or β-hydroxy-acid-amides. The splitting off of hydrogen halide is mostly carried out by treatment with acid-binding agents, such as alkalies or tertiary amines, for example dimethyl- aniline or quinoline. Especially suitable is the splitting off of hydrogen halide from α-halogen-acid-amides, because these α-halogen-acid derivatives are easily obtainable. Thus, for example, α-bromo-butyryl bromide is reacted with N-methyl-o-methylbenzylamine in the cold to form α-bromo-butyric-acid - N - methyl - o - methylbenzyl-amide which, on being heated with dimethylaniline, is converted into crotonic-acid-N-methyl-o-methylbenzylamide.

(d) There may also be mentioned the splitting off of halogen from α,β-dihalogen-acid amides, which can be effected by heating with metals such as zinc or coppered zinc (X and Y=halogen). Thus, for example, α,β-dibrom-α,β,β-trimethyl-propionic acid can be converted, through the acid bromide, into the N-ethyl-p-methoxy-ben-zylamide, from which the bromine can be split off by heating with zinc dust in xylene. In this way, α,β,β-trimethyl-acrylic - acid - N-ethyl-p-methoxy-benzylamide is obtained, whilst the bromine split off is converted with the zinc into zinc bromide.

For producing amides of α,β-unsaturated carboxylic acids of the formula

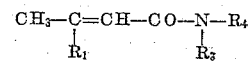

wherein R₁, R₃, and R₄ comply with the foregoing definitions, it is also possible to start with amides of the formula

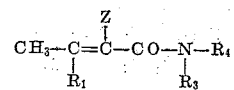

wherein Z denotes a group that is replaceable by hydrogen, and to replace the group Z by hydrogen.

The group Z may, for example, denote a carboxyl group which, on heating, is readily split off in the form of carbon dioxide. Initial materials of this kind may be produced, for example, by reacting amines of Formula II with alkylidene-malonic-acid derivatives of the formula

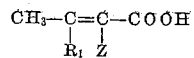

wherein R₁ is as defined above and Z denotes a carboxyl group or a radical, such as the carbalkoxy or the CN group, which can be converted by saponification into the carboxyl group or by reacting the said amines with reactive derivatives of such acids. The radical Z is then converted into the carboxyl group by saponification and the latter is split off at the same time or subsequently.

For example, isopropylidene-malonic-ester chloride is reacted with an N-alkyl-aralkylamine of Formula II to form the isopropylidene-malonic-ester-N-alkylaralkylamine. In the latter, the ester group can be saponified with hydrolysing agents to the free carboxyl group. The isopropylidene-malonic-acid-mono-N-alkyl-aralkylamide splits off carbon dioxide on heating, the corresponding β,β-dimethylacrylic-acid-N-alkyl-aralkylamide being produced.

The group Z may also denote an acetyl group. Amides of the formula

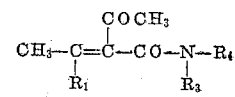

which can be obtained, for example, from alkylidene-aceto-acetic-acid esters and N-alkyl-aralkylamines, give the desired aralkyl-amides on hydrolysis.

It is also possible to produce amides of the formula

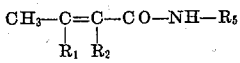

wherein $R_1$ and $R_2$ comply with the foregoing definitions and $R_5$ denotes a hydrogen atom, an alkyl or an aralkyl group, in, for example, a manner analogous to one of the methods hereinbefore described and explained and alkylating and/or aralkylating the amides obtained at the nitrogen atom.

For this operation, the methods known per se may be employed; for example, dialkyl sulphates, alkyl halides, aralkyl halides, aralkyl sulphates or alkyl and aralkyl esters of aryl-sulphonic-acids may be employed. See, for example, Titherley, Journal of the Chemical Society, London, vol. 79, page 391 (1901).

The invention will be more fully explained with the aid of the following examples, which serve to illustrate the processes described. Parts denote parts by weight unless otherwise stated and the temperatures given are in degrees centigrade.

Example 1

10.5 parts of crotonyl chloride are dropped, while stirring, into 25 parts of N-methyl-benzylamine in such a manner that the temperature rises to 130–140°. After cooling, the product of the reaction is dissolved in ether or in another solvent which is not miscible with water, and the solution is washed successively with hydrochloric acid, alkali solution and water. After distilling off the solvent, the residue is distilled in vacuo. The crotonic-acid-N-methyl-benzylamide boils at 173–175° at a pressure of 13 mm. and is a yellowish oil.

Instead of carrying out the reaction in the presence of an excess of N-methyl-benzylamine, it may be carried out in the presence of an acid-binding agent, for example potash, the reaction being advantageously carried out in a solvent, for example acetone.

Example 2

The dry sodium salt of dimethylacrylic acid is heated, together with the calculated quantity of chloroformic-acid-N-methyl-benzylamide, in a capacious flask until the evolution of carbon dioxide, which takes place with vigorous frothing, has ceased. The whole is cooled to about 100° C., hot water is added and the whole is boiled for a short time. After cooling, the product is taken up in ether and the solution is washed successively with dilute acid, water and a dilute solution of alkali and then again with water. After drying with sodium sulphate, the ether is distilled off. The dimethylacrylic-acid-N-methyl-benzylamide, which is obtained as residue, is then purified by distillation in vacuo. It boils at 170–172° at a pressure of 12 mms.

Example 3

14.6 parts of ethyl β-hydroxy-isovalerianate are heated with 12.1 parts of N-methyl-benzylamine at about 160° until the splitting-off of alcohol ceases. After cooling, sodium hydrogen sulphate is added, the whole is heated for a short time at 190–200°, and the dimethylacrylic-acid-N-methyl-benzylamide that is formed is distilled in vacuo. It boils at 170–172° at a pressure of 12 mms. and is a yellowish oil.

Example 4

17.7 parts of ethylidenemalonic-acid-mono-ethylester chloride, which is produced by usual methods, are added slowly to an ethereal solution of 27 parts of N-methyl-benzylamine. In order to complete the reaction, the whole is heated at boiling for some time under reflux. The ethereal solution is then washed with dilute hydrochloric acid and water. The residue, which remains on distilling the ethereal solution, is saponified by heating with soda solution. The solution is then carefully acidified and extracted with ether. The residue produced on evaporation of the ethereal solution is heated at 200° until the evolution of carbon dioxide ceases. The crotonic-acid-N-methylbenzylamide produced boils at 173–175° at a pressure of 12 mm.

Example 5

20.3 parts of dimethylacrylic-acid-benzylamide in 30 parts by volume of absolute toluene are mixed with 4 parts of sodamide which has been finely pulverised under toluene and the whole is heated, with stirring, until no more ammonia escapes. The sodium salt of dimethyl-acrylic-acid-benzylamide separates as a jelly. At 50–60°, 13 parts of dimethylsulphate are run in and the whole is heated at boiling for 10 hours under reflux. The whole is then diluted with water, the layers are separated in a separating funnel and the toluene solution is washed successively with a dilute solution of alkali, acid and water. After distilling off the toluene, the dimethyl-acrylic-acid-N-methyl-benzylamide passes over at 170–172° and at a pressure of 12 mms. as a yellowish-coloured oil.

By means of the processes described, there can be produced in addition, for example, the following compounds to which, however, the invention is not limited:

Crotonic acid - N - ethyl - benzylamide (b. pt. 166–167°/11 mm.)
Crotonic acid-N-isopropyl-benzylamide
Crotonic acid-N-ethyl-p-methyl-benzylamide
Crotonic acid - N - methyl - 3:4 - dimethyl - benzylamide (b. pt. 139–141°/0.1 mm.)
Crotonic acid - N - methyl - 3:4 - dichloro-benzylamide
Crotonic acid-N-ethyl-4-methoxy-benzylamide
Crotonic acid-N-methyl-α-methyl-benzylamide
Crotonic acid-N-ethyl-α-ethyl-benzylamide
Crotonic acid-N-methyl-α-propyl-benzylamide
Crotonic acid-N-methyl-α-ethyl-p-methyl-benzylamide
Crotonic acid-N-methyl-α-methyl-3:4-dimethyl-benzylamide
Crotonic acid - N - propyl - 2:4 - dimethyl - benzylamide
Dimethylacrylic acid-N-ethyl-benzylamide (b. pt. 121–124°/0.1 mm.)
Dimethylacrylic acid-N-amyl-benzylamide
Dimethylacrylic acid - N - methyl - 3:4 - dimethyl-benzylamide (b. pt. 136–138°/0.1 mm.)
Dimethylacrylic acid-N-propyl-4-chloro-benzylamide
Dimethylacrylic acid-N-methyl-α-methyl-benzylamide
Dimethylacrylic acid-N-methyl-α-ethyl-benzylamide
Dimethylacrylic acid-N-ethyl-α-propyl-benzylamide
Dimethylacrylic acid - N - methyl - α - methyl-p-methoxy-benzylamide Trimethylacrylic acid-N-methyl-benzylamide (b. pt. 116-121°/0.2 mm.)
Trimethylacrylic acid-N-ethyl-benzylamide (b. pt. 115-118°/0.1 mm.)
Trimethylacrylic acid-N-methyl-2:5-dimethyl-benzylamide.

Since the compounds described above are practically odourless and produce no skin-irritation or other harmful symptoms on warm-blooded animals when correctly used, they are particularly suitable for the preparation of acaricidal agents, as originally mentioned.

For example, the use of following compounds (in 10% acetone solution) completely exterminates *Psoroptes cuniculi* inside 48 hours:

Crotonic acid-N-methyl-benzylamide
Dimethylacrylic acid-N-methyl-benzylamide
Crotonic acid-N-ethyl-benzylamide
Crotonic acid - N - methyl - 3:4 - dimethyl - benzylamide
Crotonic acid-N-methyl-δ-phenyl-butylamide
Dimethylacrylic acid-N-ethyl-benzylamide
Dimethylacrylic acid - N - methyl - 3:4 - dimethyl-benzylamide
Trimethylacrylic acid-N-methyl-benzylamide
Trimethylacrylic acid-N-ethyl-benzylamide.

It should be noted, however, that in most cases the limit of effective concentration is considerably lower. Furthermore, the mites become paralysed in a very short space of time so that already long before death they are unable to cause any more damage. The first two amides in the above list have been found particularly effective.

*Experiments with other mites*

Experiments with flour mites (*Aleurobius farinae*), cheese mites (*Tyroglyphus siro*) and the red spider (*Paratetranychus hummili*) gave the following results (per cent of kills within . . . . hours). The concentration used for *Aleur. far.* and *Tyrogl. siro* was $10^{-4}$ g./cm.$^2$ and for *Paratetr. hummili* $10^{-5}$ g./cm.$^2$.

| | Aleur. far. | Tyrogl. siro | Paratetr. h. |
|---|---|---|---|
| crotonic acid-N-methyl-benzylamide. | 100%, 4 Hrs. | 100%, ½ Hr. | |
| dimethylacrylic N-methyl-benzylamide. | 100%, 4 Hrs. | 100%, 4 Hrs. | 92%, 8 Hrs. |

The nature of the compositions depends on the purpose of their employment. The active compounds can be employed as such or in suitable solvents or diluents, in the form of emulsions or dispersions, on suitable solid or semi-solid carrier substances, in ordinary or synthetic soaps, detergents, dispersing agents or the like, or together with other acaricidal, insecticidal, ovicidal, fungicidal and/or bactericidal compounds or together with inert adjuvants. As solid carriers, which are suitable for the manufacture of pulverulent preparations, various inert, porous and pulverulent distributing agents of an inorganic or organic nature may be employed, for example, tricalcium phosphate, calcium carbonate in the form of whiting or ground chalk or limestone, kaolin, bole, bentonite, talcum, calcined magnesia, kieselguhr, boric acid, also powdered cork, powdered wood and other pulverulent materials of vegetable origin are suitable carrier substances. The active components are mixed with such carriers, e. g., by milling together; or the inert carrier is impregnated with a solution of the active component in an easily volatilised solvent and the latter then driven off by heating or by suction under reduced pressure. By adding wetting— and/or dispersing agents, such pulverulent preparations can be rendered easily wettable by water so as to obtain stable suspensions suitable for use as spraying agents, for example, in plant protection.

Suitable extenders for use in making liquid preparations are e. g.: Alcohols, such as isopropyl alcohol, cyclohexanol, propylene glycol, glycerol, benzyl alcohol and the like; ketones, such as cyclohexanone etc.; esters, such as ethyl and butyl benzoate, dialkyl phthalate, olive oil, castor oil; hydrocarbons and chlorinated hydrocarbons, such as carbon tetrachloride, tetrachlorethane, hydrogenated naphthalenes, alkylated naphthalenes, solvent naphtha, mineral oil distillates, like kerosene and paraffin oil, etc. Naturally, mixtures of solvents can also be used. The preparation of solutions is carried out in the usual manner, if required, with the aid of solubility promoters.

Other practical liquid forms consist of emulsions or suspensions of the active component in water or suitable inert solvents, or of concentrates for preparing such emulsions which can be adjusted to the desired working concentration by dilution at the place of use. For this purpose, the active component is mixed with a dispersing or emulsifying agent. The active component may also be dissolved or dispersed in a suitable inert solvent and mixed at the same time or subsequently with a dispersing or emulsifying agent. By diluting such a concentrate, for example with water, emulsions or suspensions ready for use are obtained. With a suitable concentration and mixing proportion of active component, emulsifying agent and water, clear, entirely stable aqueous solutions (emulsoids) can be obtained.

Various capillarily active substances with an anion-active or a cation-active or a non-ionising component may be employed as dispersing or emulsifying agents. There may be mentioned, by way of example, natural or synthetic soaps, turkey red oil, fatty-alcohol sulphonates, sulphonated fats, esters of fatty acids, and the like, also higher molecular quaternary ammonium compounds, as well as condensation products of aliphatic or araliphatic compounds and ethylene oxide, for example, the condensation product of stearin alcohol and ethylene oxide.

For special purposes, semi-solid extenders of the nature of a cream, ointment, paste or wax may be employed, into which the active substance can be worked, with the aid of solubility-promoters and/or of emulsifying agents, if required. Such semi-solid preparations are mostly emulsions. Soft soap (potassium stearate) or Vaseline may be mentioned as examples of semi-solid extenders.

The active component itself may consist of one or more compounds of the formula defined. Also, it may be used together with other acaricides, insecticides, ovicides, fungicides or bactericidal substances. There may be mentioned, by way of example as other substances of this kind: benzyl benzoate, dimethyl thianthrene, phthalonitrile, $\alpha:\alpha$-bis-(chlorophenyl)-$\beta:\beta:\beta$-trichlorethane or -$\beta:\beta$-dichlorethane (DDT and DDD), 2-ethyl-hexane-diol-1:3, dinitrocresol, nitrated naphthylamines, mercury compounds or inorganic substances such as copper compounds, sublimate or sulphur. Composite preparations with a great range of effectiveness are obtained in this manner.

It is also possible to employ the active component in the form of aerosols. For this purpose, the active component is dissolved or dispersed, with the aid of suitable inert solvents as carrier liquids, if required, in a solvent such as Freon which boils below room temperature at atmospheric pressure. There are thus obtained solutions under pressure which, on being sprayed, give aerosols which are specially suitable for combating mites in closed spaces, in grain silos and other store rooms.

The following may be mentioned as further additives which can be mixed with the various forms of composition mentioned: adhesive substances such as casein salts of fatty acids, glue, resins, fats, albumen-degradation products; wetting agents, solubility promoters, dyestuffs and perfumes and, in the case of pulverulent preparations, dust-binding media and so on.

It is quite possible, by selecting the various extenders and additives, to give the agents such a composition and properties, depending thereon, as to render them suitable for special purposes or conditions of employment. Thus, it is possible to produce, for example, dips, sprinkling agents, and spraying agents in the form of emulsions or suspensions, as well as emulsions and suspensions for general use and concentrates for their preparation. The agents mentioned are mostly liquid preparations. The following are solid preparations: dusting agents, drying powder, strewing agents and such like, and also solid soap preparations which can be employed in the form of moulded pieces.

The present acaridae combating agents can be applied by methods of application usual for insecticides. The acaridae or the materials, for example, plants, roots, root nodules, drugs, textiles, packing materials, cereals, dried fruits, stores of foodstuffs and fodder, seeds, wood, leather, skins, paper, furs, hair, feathers, articles of all kinds, carpets, walls and floors, which are to be treated or protected from attack by or harbourage of acaridae, can be treated with the active component or with the agents described, by dusting, strewing, sprinkling, smearing, rubbing in, impregnating or other suitable methods.

As mentioned at the beginning, the active compounds having the formula defined have a strong bactericidal or growth-inhibiting action on various sources of infection, such as, e. g., streptococci, staphylococci and diphtheria bacilli. The action on staphylococci is revealed in the following experimental results. These tests for bacteriostatic activity were carried out using a modified plate method due to Fleming:

| Compound (5 mg. quantities) | Inhibition Diameter mm. |
|---|---|
| crotonic acid-N-methyl-3:4-dimethyl-benzylamide | 8 |
| crotonic acid-N-methyl-δ-phenyl-benzylamide | 10 |
| β:β-dimethylacrylic acid-N-methyl-benzylamide | 3-8 |
| β:β-dimethylacrylic acid-N-ethyl-benzylamide | 8 |
| β:β-dimethylacrylic acid-N-methyl 3:4-dimethyl-benzylamide | 10 |
| rimethylacrylic acid-N-methyl-benzylamide | 12 |
| trimethylacrylic acid-N-ethyl-benzylamide | 5 |
| comparison compound: Iodo-chloro-hydroxy-quinoline | 3-5 |

Thus the agents prepared according to the invention can also be used as disinfectants in the event of a disinfectant action being necessary or desired. Accordingly, articles of clothing or underwear, implements, utensils and other articles as well as living-rooms, surgical instruments and adjuvants can all be disinfected using the agents.

Also, agents which contain the active component herein defined are very suitable for cleaning, disinfecting and washing warm-blooded animals attacked by mites. The following are particularly suitable extending agents for this purpose: liquid extenders, e. g., paraffin oil or vegetable oils such as olive oil, caster oil, sesame oil and also glycerine, and the like. Suitable semi-solid extenders are, e. g., Vaseline, wool fat and the like. Suitable emulsifying agents for the preparation of aqueous solutions and emulsions, for example, are above all soaps, but also sulphonated fats, fatty acid esters and fatty alcohol sulphonates, higher molecular quaternary ammonium compounds, as well as non-ionising emulsifying agents, such as condensation products of fatty alcohols with ethylene oxide.

However, emulsions of ointment-like consistency can also be produced, for example by employing stearic acid, fatty acid salts and water. For the production of fat-free ointments, cellulose ether bases may be employed, or other steeping or swelling substances of animal, vegetable or synthetic origin and water, or inorganic substances, such as aluminum-hydroxide gel, in which the active substances can be incorporated, if necessary with the aid of emulsifying agents and/or solubility agents such as paraffin oil. If desired, the preparations obtained may be perfumed by the addition of perfumes. Examples of good, adhesive pulverulent carrier substances are, talcum, starch, lactose and the like.

Many other solids can also be used as carriers, e. g., textile fabrics, cotton wool, sheets of paper or water-soluble celluloses, which can be, for example, impregnated with the active ingredient.

Furthermore, the bactericidal action can be extended by the addition of phenols, such as p-chloro-m-cresol, o-butyl-p-chloro-phenol, o-benzyl-p-chloro-phenol, chloro-xylenol, cyclohexylphenol, oxydiphenyl and similar compounds.

The active ingredients may also be combined with many other disinfectants and fungicides, e. g., with quaternary ammonium compounds, hydroxyquinoline derivatives, mercury or colloidal silver preparations, thiocyanic acid etc. Furthermore other inactive additives may be incorporated, such as stickers, solution-promoters, wetting-agents and the like. In special cases an auxiliary substance such as a wetting agent can also have bactericidal action and increase thereby the disinfectant action of the medium. Foam producing substances are also particularly effective for this purpose, such as e. g., ordinary or synthetic soaps, saponines and so on.

Various modes of preparation of the acaricidal and disinfecting media as well as their uses are described in the following examples. The invention is not restricted to these examples, however. The parts are given throughout by weight and temperatures are in degrees centigrade.

*Example 1*

5 parts of crotonic acid-N-methyl-benzylamide (b. pt. at 13 mm. 172–176°) are ground together with 92 parts of talcum in a ball mill, 2 parts of olein are then added, the whole is again ground and is finally mixed with 1 part of slaked lime.

The resulting acaricidal powder is easily scattered and has good adhesive power. It can be employed for the dusting of rooms and articles or for the protection of plants. A still better distribution of the active substance over or in the carrier material is obtained when the carrier is impregnated with a solution of the active substance, in alcohol or acetone, for example, and the solvent then evaporated.

*Example 2*

15 parts of crotonic acid-N-ethyl-benzylamide are mixed with 22.3 parts of kaolin; 4 parts of the sodium salt of dibutyl-naphthalenesulphonic acid, 4 parts of casein and 4.7 parts of soda are added and the whole is ground. 100 parts of finely ground chalk are then mixed in. The resulting powder gives, in water, a sufficiently stable suspension which can be employed for spraying rooms and articles attacked by mites and, for example, also for the protection of plants.

Instead of 15 parts of crotonic acid-N-ethyl-benzylamide there may be employed: 5 parts of crotonic acid-N-ethyl-benzylamide and 10 parts of DDT ($\alpha$:$\alpha$-bis-(p-chlorophenyl) - $\beta$:$\beta$:$\beta$ - trichlorethane) or 10 parts of crotonic acid-N-ethyl-benzylamide and 5 parts of said DDT.

*Example 3*

80 parts of $\beta$:$\beta$-dimethylacrylic acid-N-methyl-benzylamide are finely ground together with 20 parts of talc. This concentrate can be employed directly as strewing powder for combating mites as well as for disinfecting purposes. However, it may be diluted to any desired concentration.

Such powders, which can also be produced with other bases are suitable as dusting agents, for example for combating mites and on human or animal skin for purposes of disinfection. Powder preparations, for example with a basis of starch-flour, may also be employed for combating mites in storehouses, by mixing with grain, for example. If necessary, substances may be added for improving adhesion, for which purpose, for example, an addition of 4% of a liquid fatty acid is suitable.

*Example 4*

5 parts of $\beta$:$\beta$-dimethylacrylic acid-N-ethyl-benzylamide are dissolved in 95 parts of alkylated naphthalene (Velsicol) and employed as a household spraying agent.

*Example 5*

By mixing 10 parts of $\beta$:$\beta$-dimethylacrylic acid-N-ethyl-benzylamide with 90 parts of olive oil, a clear solution is obtained which can be employed for combating mites and for purposes of disinfection.

*Example 6*

30 parts of $\beta$:$\beta$-dimethylacrylic acid-N-ethyl-benzylamide stirred up with 70 parts of potash soap give a homogeneous paste. On dilution with water an emulsion is produced which is suitable for use as a washing-fluid with acaricidal and disinfecting properties.

*Example 7*

By stirring 7 parts of $\beta$:$\beta$-dimethylacrylic acid-N-ethyl-benzylamide with 93 parts of alcoholic soap solution, a clear solution is obtained. More concentrated solutions may also be produced which turn into emulsions on being diluted with water. Instead of 7 parts of $\beta$:$\beta$-dimethylacrylic acid-N-ethyl-benzylamide, 5 parts of $\beta$:$\beta$-dimethylacrylic acid-N-ethyl-benzylamide and 2 parts of chloro-xylenol may be used, giving an emulsion especially suitable for purposes of disinfection.

*Example 8*

8 parts of paraffin, 15 parts of stearic acid, 5 parts of wool fat and 2 parts of wax are heated together at 80° C. At this temperature there are stirred in 3 parts of glycerine, 1 part of triethanolamine, 58.5 parts of water (previously heated to 80° C.) and 0.5 part of concentrated ammonia. The finished ointment base is stirred with 10 parts of $\beta$:$\beta$-dimethylacrylic acid-N-methyl-benzylamide (b. pt. 170–172°/13 mm.), with the result that a homogeneous cream with a powerful mite-exterminating and disinfectant action is obtained, which is especially suitable for treating parts of the skin which have been attacked by mites.

*Example 9*

3 parts of methyl cellulose are soaked in 90 parts of hot water and the swollen mass obtained is intimately mixed with 7 parts of $\beta$:$\beta$-dimethylacrylic acid-N-ethyl-benzylamide. A fat-free acaricidal and disinfectant ointment is thus obtained. Instead of methyl cellulose, other swelling substances, such as tragacanth, gelatins or alginates, may be employed.

*Example 10*

7 parts of $\beta$:$\beta$-dimethylacrylic acid-N-methyl-benzylamide are stirred with 93 parts of vaselinum flavum until uniform distribution is obtained. An ointment with good acaricidal and bactericidal properties is obtained. By diluting with suitable solvents, the ointment can be given a thinner consistency.

*Example 11*

A solution of 5 parts of $\beta$:$\beta$-dimethylacrylic acid-N-methyl-benzylamide, 5 parts of cyclohexanone and 90 parts of Freon can be employed as a pressure solution for an aerosol bomb. When sprayed, an aerosol is obtained which is specially suitable for combating mites in enclosed spaces such as, for example, in grain silos. It is equally suitable for use for disinfecting rooms.

*Example 12*

10 parts of $\beta$:$\beta$-dimethylacrylic acid-N-methyl-3:4-dimethyl-benzylamide and from 3 to 25 parts of fatty acid ester-sulphonate together give a solution which, on dilution with water, gives a milky or clear solution, according to the constitution of the selected fatty acid ester-sulphonate and the proportion.

It is also possible to mix the amide with the same quantity of xylene and 1½ times the quantity of Turkey red oil. The clear solution obtained can be emulsified in water in any proportion.

Such solutions or emulsions may be employed with advantage for different purposes. Thus, they are suitable for spraying in rooms which have been attacked by mites or endangered by them. In addition, however, articles of various kinds which have been attacked by mites or which are to be protected from attack can also be sprayed with this solution or impregnated by immersion therein. Fabric or paper sacks and containers and other packing materials impregnated with this solution are suitable for the mite-free storage of provisions and other supplies. Similarly, these emulsions can also be employed in the protection of plants.

Also, parts of the body, both of human beings and animals can be treated with such a solution for acaricidal or disinfectant purposes. To this end the solution can be painted on or rubbed in. For treating small animals it is useful to employ such a solution as a bathing liquid.

*Example 13*

490 parts of crotonic acid-N-methyl-3:4-dimethyl-benzylamide and 14 parts of a cation-active emulsifier are dissolved together in 496 parts of alcohol. On dilution with water to a content of 1–10% of active acid amide, milky emulsions are obtained. These can be employed for substantially the same purposes as the emulsions which are obtained on employing anion-active emulsifiers.

*Example 14*

A solution of 50 parts of crotonic acid-N-methyl-benzylamide in 50 parts of isopropylalcohol is suitable for smearing on the skin of both men and animals as an insect-repellent.

In place of the active ingredients given in the above examples other such compounds previously mentioned can be employed.

Insecticidal and ovicidal preparations are prepared according to the usual methods therefor. Very often the information given above for the manufacture of acaricidal or disinfecting agents applies equally well. This holds also for the preparation of insect deterrents and repellents, for which, however, principally solutions come into question, e. g., in isopropyl alcohol or in other similar, and in particular, non-toxic solvents.

What we claim is:

1. An acaricide and simultaneous disinfectant comprising as an essential active ingredient an amide of the formula

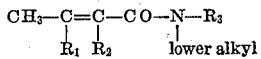

wherein $R_1$ and $R_2$ represent a member selected from the group consisting of hydrogen and a methyl group, $R_3$ represents a benzyl radical substituted in the benzene nucleus by a member selected from the group consisting of hydrogen, chlorine, methyl and methoxy, and a carrier therefor selected from the group consisting of semi-solid and oily vehicles non-irritating to the human skin.

2. An acaricide and simultaneous disinfectant comprising as an essential active ingredient an amide of the formula

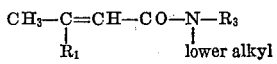

wherein $R_1$ represents a member selected from the group consisting of hydrogen and methyl, $R_3$ represents a benzyl radical substituted in the benzene nucleus by a member selected from the groups consisting of hydrogen, chlorine, methyl and methoxy, and a carrier therefor selected from the group consisting of semi-solid and oily vehicles non-irritating to the human skin.

3. An acaricide and simultaneous disinfectant comprising as an essential active ingredient an amide of the formula

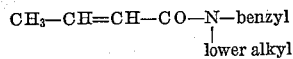

and a carrier therefor selected from the group consisting of semi-solid and oily vehicles non-irritating to the human skin.

4. An acaricide and simultaneous disinfectant comprising as an essential active ingredient an amide of the formula

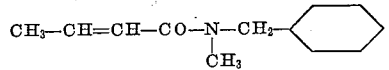

and a carrier therefor selected from the group consisting of semi-solid and oily vehicles non-irritating to the human skin.

5. An acaricide and simultaneous disinfectant comprising as an essential active ingredient an amide of the formula

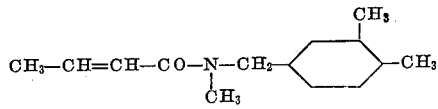

and a carrier therefor selected from the group consisting of semi-solid and oily vehicles non-irritating to the human skin.

6. An acaricide and simultaneous disinfectant comprising as an essential active ingredient an amide of the formula

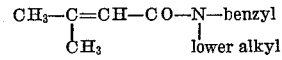

and a carrier therefor selected from the group consisting of semi-solid and oily vehicles non-irritating to the human skin.

7. An acaricide and simultaneous disinfectant comprising as an essential active ingredient an amide of the formula

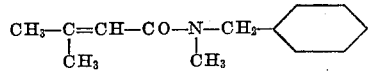

and a carrier therefor selected from the group consisting of semi-solid and oily vehicles non-irritating to the human skin.

HENRY MARTIN.
ALFRED MARGOT.

REFERENCES CITED

The following references are of record in the file of this patent:

UNITED STATES PATENTS

| Number | Name | Date |
|---|---|---|
| 2,288,197 | Kranzlein et al. | June 30, 1942 |
| 2,368,195 | Britton et al. | Jan. 30, 1945 |
| 2,401,885 | Semon | June 11, 1946 |

OTHER REFERENCES

Bischoff: "Ber. Deut. Chem.," vol. 34 (1901), pp. 2136 and 2138.

Buehler et al.: "Jour. Am. Chem. Soc.," vol. 59 (1937), pp. 421–422.